United States Patent [19]
Oehme

[11] Patent Number: 5,934,322
[45] Date of Patent: Aug. 10, 1999

[54] TRANSMISSION SHIFT VALVES WITH LATCHING CONTROL

[75] Inventor: Clifford H. Oehme, Avon, Ind.

[73] Assignee: General Motors Corporation, Detroit, Mich.

[21] Appl. No.: 09/094,181

[22] Filed: Jun. 9, 1998

[51] Int. Cl.⁶ .......................... F15B 13/043; F15B 13/07
[52] U.S. Cl. ................ 137/625.64; 91/426; 137/596.16; 192/87.1; 192/87.14
[58] Field of Search .................. 91/426; 137/596.16, 137/625.64; 192/87.1, 87.14

[56] References Cited

U.S. PATENT DOCUMENTS

| | | | |
|---|---|---|---|
| 4,617,968 | 10/1986 | Hendrixon | 137/625.64 |
| 4,848,404 | 7/1989 | Hickok | 137/625.64 |
| 5,564,543 | 10/1996 | Wilson | 192/85 R |

*Primary Examiner*—Gerald A. Michalsky
*Attorney, Agent, or Firm*—Donald F. Scherer; Jeffrey A. Sedlar

[57] ABSTRACT

A power transmission has a plurality of shift valves each of which has an engaged position and a disengaged position. Each shift valve has a pair of chambers which is selectively pressurized by a latching valve to maintain the shift valves in their respective selected positions. During a ratio change, the latching valve discontinues pressure at the respective shift valve chambers to permit the appropriate shift valve movement.

2 Claims, 2 Drawing Sheets

TRANSMISSION SHIFT VALVES WITH LATCHING CONTROL

TECHNICAL FIELD

This invention relates to shift valves in a hydro-electric transmission control.

BACKGROUND OF THE INVENTION

U.S. Pat. No. 5,564,543 issued to Wilson on Oct. 19, 1996, and assigned to the assignee of the present invention, describes a transmission control having a latching valve. The latching valve is effective to selectively maintain selected shift valves in an upshifted or engaged position with a latch pressure and to release the latch pressure when a ratio change occurs. The shift valves are maintained in the disengaged or downshifted position by a bias spring.

SUMMARY OF THE INVENTION

It is an object of the present invention to provide an improved transmission shift control having latchable shift valves.

In one aspect of the present invention, each shift valve has a pair of latched chambers, one of which is pressurized to latch the respective shift valves in the disengaged position when one of the shift valves has been moved to an engaged position.

In another aspect of the present invention, the other latch chamber is pressurized to latch the one shift valve in the engaged position while the other shift valve is latched in the disengaged position.

In yet another aspect of the present invention, the latching pressure is discontinued during a ratio interchange.

In a further aspect of the present invention, the shift valves each have a solenoid valve which supplies the required pressure to move each valve to the engaged position.

In a still further aspect of the present invention, the solenoid valve controlling the shift pressure can be turned off to discontinue the control pressure after the ratio change is completed and the latch pressure has been established.

DESCRIPTION OF AN EXEMPLARY EMBODIMENT

Figure 1:
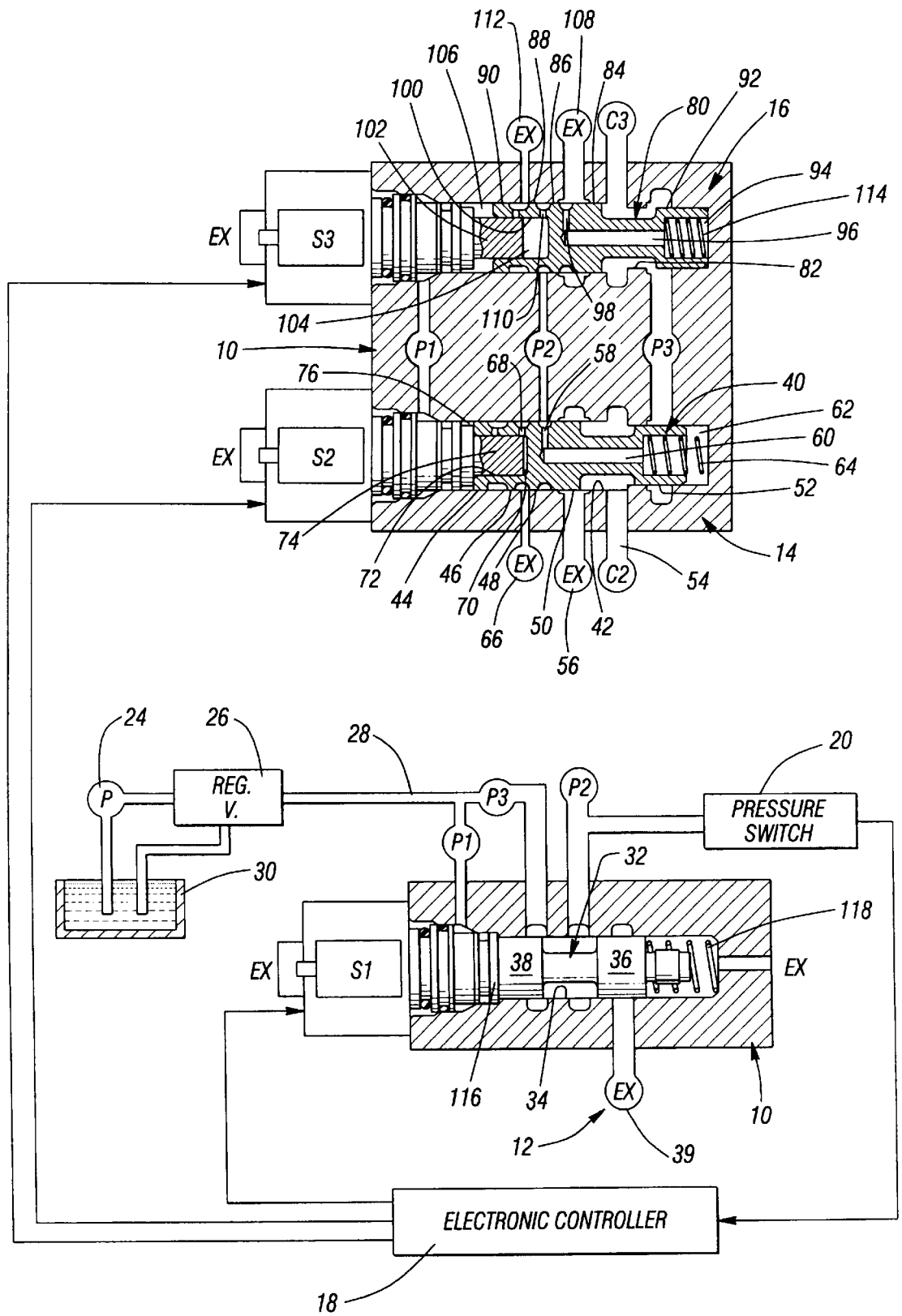
FIG. 1 is a diagrammatic representation of a portion of a transmission control incorporating the present invention.

Referring to the drawings, wherein like characters represent the same or corresponding parts throughout the several views, there seen in FIG. 1 a portion of a transmission control mechanism having a valve body 10, in which is slidably disposed a latch valve 12 and a pair of shift valves 14 and 16. Each control valve has a solenoid valve, for example, latch valve 12 has a solenoid valve S1, shift valve 14 has solenoid S2, and shift valve 16 has a solenoid S3. The solenoid valves are well known in the art. It is known that such valves can provide a variable output pressure depending upon the electronic or electric control signal given to them.

The solenoid valves are controlled by a conventional electronic controller 18 which may include a preprogrammed digital computer and provides control signals to the solenoid valves S1, S2 and S3 in a well known manner. The electronic controller 18 receives an input signal from a pressure switch 20 which, as will be explained later, informs the electronic control that the matching pressure has been achieved.

The transmission control further includes a positive displacement pump 24 which supplies fluid pressure through a regulator valve 26 to a pressure passage 28. The pressure passage 28 is in fluid communication with a pressure passage P1 and a pressure passage P3. The regulator valve 26 returns excess oil from the pump 24 to a conventional sump or reservoir 30.

The passages P1 and P3 are in fluid communication with the valve body 10 and provides fluid to the latch valve 12 and the shift valves 14 and 16. The passage P1 provides fluid pressure to each of the solenoid valves S1, S2 and S3 which is then distributed to provide shifting control on the shift valves 14 and 16 and on the latch valve 12 in a well known manner.

The latch valve 12 includes a valve spool 32 slidably disposed in a valve bore 34. Valve bore 34 is formed in the valve body 10. The valve spool 32 has a pair of spaced equal diameter lands 36 and 38 which cooperate to distribute fluid pressure between the passage P3, a fluid passage P2 and an exhaust passage 39.

In the position shown for valve spool 32, the land 36 is blocking the exhaust passage 39 while the space between lands 38 and 36 permits fluid communication between the passage P3 and P2. Since the passage P3 is continually pressurized from the pump 24, at this point the passage P2 will be receiving mainline or maximum system pressure.

When the passage P2 achieves maximum system pressure or the maximum pressure to be distributed, the pressure switch 20 is activated which informs the electronic controller 18 that the passage P2 has been pressurized. The passage P2 carries a latching pressure which is distributed to the shift valves 14 and 16.

The shift valve 14 includes a valve spool 40 slidably disposed in a stepped diameter bore 42. The valve spool 40 has four equal diameter spaced lands 44, 46, 48 and 50, and a single smaller diameter land 52. The land 52 is effective in the disengaged or downshifted position shown to prevent fluid pressure in passage P3 from being distributed to an output passage 54 which is connected to a friction device C2. The space between valve land 50 and valve land 52 permits fluid communication between the passage 54 and an exhaust port 56, such that the friction device C2 is exhausted and therefore in the disengaged position.

The space between valve lands 50 and 48 is in fluid communication with the pressure in passage P2 which is the latching pressure. The latching pressure in P2 is distributed between lands 48 and 50 through a radial passage 58 to an axial passage 60. The axial passage 60 is in fluid communication with a latching chamber 62 formed by the valve bore 42 and the valve land 52.

The latching chamber 62 also houses a bias spring 64 which assists in urging the valve spool 40 to the disengaged position shown. In this position, the space between valve lands 48 and 46 provides fluid communication between an exhaust passage 66 and a radial passage 68 formed in the valve spool 40.

The radial passage 68 is in fluid communication with a latch chamber 70 formed by a bore 72 in the valve spool 40 and a plug valve 74. The plug valve 74 is also in fluid communication with a shift control chamber 76 which is pressurized and exhausted by the solenoid valve S2 depending upon the desired shift position or operating position of the shift valve 14.

In the position shown, the latch chamber 70 is exhausted through the exhaust passage 66, such that the valve spool 40 of shift valve 14 is maintained or latched in the downshift or disengaged position by fluid pressure in chamber 62 and the spring 64.

The shift valve 16 includes a valve spool 80 which is slidably disposed in a valve bore 82. The valve spool 80 has four equal diameter lands, 84, 86, 88 and 90, and a smaller land 92. The valve land 92 cooperates with the bore 82 to form a latch chamber 94 which is in fluid communication with an axial passage 96 and a radial passage 98.

The valve spool 80 also has a recess or bore portion 100 in which a plug 102 is slidably disposed and cooperates therewith to form a latch chamber 104. The plug 102 is in fluid communication with a shift control chamber 106 which is pressurized and exhausted by the solenoid valve S3 to establish the shift control position for the shift valve 16. The shift valve 16 is shown in the upshifted or engaged position, such that the fluid pressure in passage P3 is in fluid communication with the friction device C3 between the valve lands 92 and 84.

The latch chamber 94 is in communication with an exhaust passage 108 through the passages 96 and 98 while the latch chamber 104 is in fluid communication with the pressure in the passage P2 through a radial passage 110 formed between the lands 86 and 88. Any fluid pressure in either chamber 106 or 104 which leaks along the plug 102 is connected or delivered to the sump 30 through an exhaust passage 112.

From the above description, it should be evident that the pressure in passage P2 is effective to latch the shift valve 14 in the downshifted or disengaged position and the shift valve 16 in the upshifted or engaged position.

Figure 2:
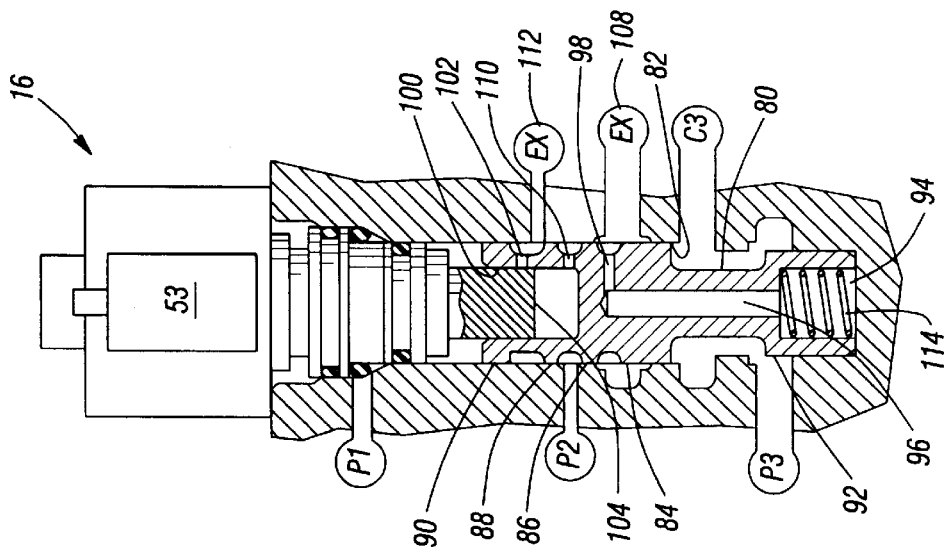
FIG. 2 is a diagrammatic representation of one of the shift valves during the shift phase of operation.
Figure 3:
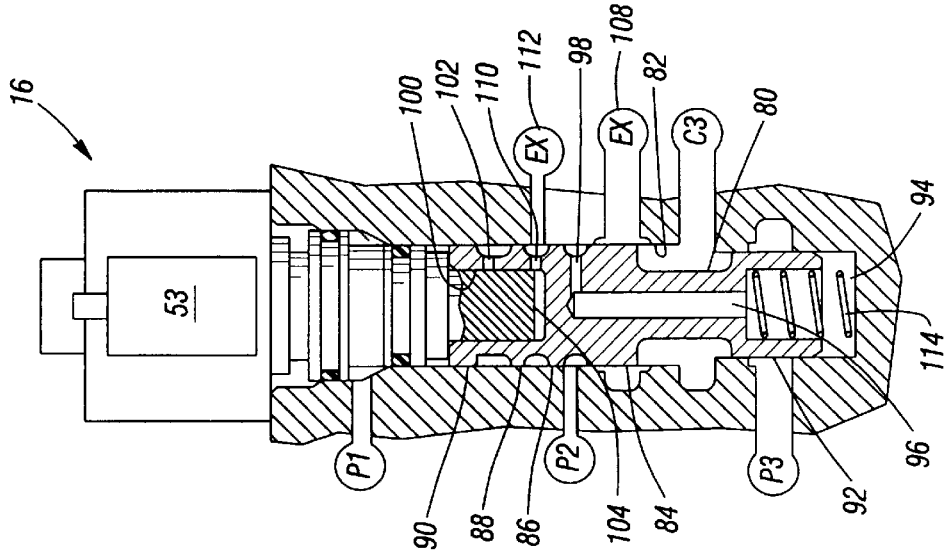
FIG. 3 is a diagrammatic representation of the shift valve latched in a disengaged position.
Figure 4:
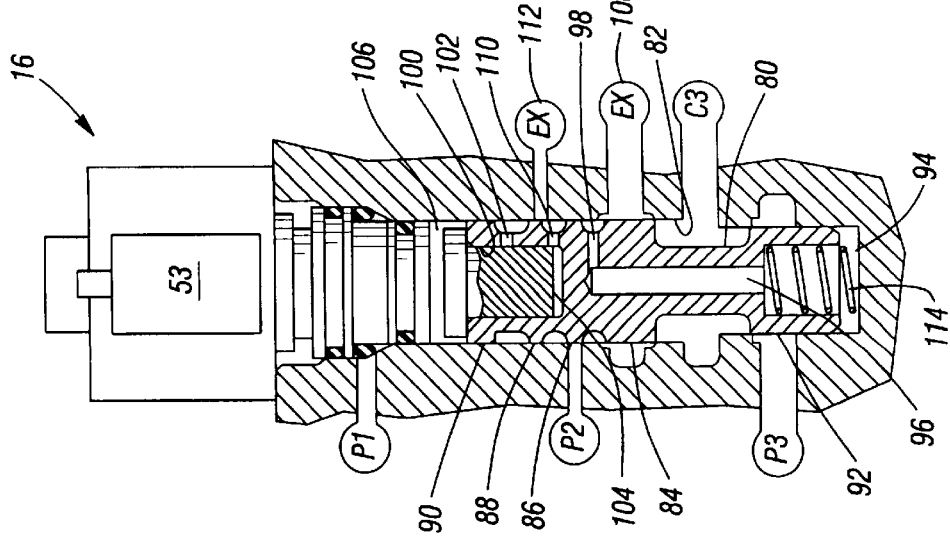
FIG. 4 is a diagrammatic representation of the shift valve latched in the engaged position.

FIGS. 2, 3 and 4 describe the shift valve 16 in an enlarged view. The shift valve 16 in FIG. 4 is maintained in the engaged position while the shift valve 16 in FIG. 3 is maintained in the disengaged position. similar to the disengaged position of shift valve 14 described above.

In FIG. 2, the shift valve 16 is shown in the ratio interchange or shifting condition. During the shifting condition, the shift control chamber 106 is pressurized by solenoid S3 thereby urging the valve spool 80 against a bias spring 114 which is disposed in the latch chamber 94.

During the shifting operation, the latch valve 12 is pressurized by the solenoid valve S1 at a control chamber 116. This will cause the valve spool 32 to move rightward, as viewed in FIG. 1, against a bias spring 118, such that the passage P3 is closed by land 38 while the space between lands 38 and 36 permits the pressure in passage P2 to be exhausted at exhaust passage 39.

When the pressure in passage P2 is exhausted, the valve spools 40 and 80 are moved toward their spring set position. However, the solenoid valves S2, S3 on each of the shift valves 14, 16, become operable to control the pressure in the shift control chambers 76 and 106. As seen in FIG. 2, the fluid pressure in chamber 106 controls the positioning of the valve spool 80 within the valve bore 82.

When the valve spool 80 has been moved completely to the position requested by the electronic controller, for example, from the disengaged position shown at shift valve 16 in FIG. 3, to the engaged position shown in FIG. 4, the control pressure in chamber 116 of the latch valve 12 is released, such that the spring 118 will reset the valve to the latching position shown in FIG. 2 and passage P2 will be pressurized. When passage P2 is pressurized, the shift valve 16 will be held in the appropriate position.

During the shift interchange, however, the valve land 84 closes the exhaust passage 108 from the C3 passage while the valve land 92 controls fluid pressure in the passage P3 from entering the friction device C3. Also, at this time, the pressure in the latch chamber 94 is exhausted through passage 108 while the pressure in chamber 104 is exhausted through passage 112. The fluid pressure in passage P2 is exhausted during a ratio interchange.

If the shift valve 16 is to be moved to the engaged position, that is the position shown in FIG. 4, the pressure in chamber 106 will be increasing thereby admitting pressure from passage P3 to the friction device C3. Also, at this time, pressure on a differential area, established by the large land 84 and the small land 92, will be in a direction to aid the spring 114 and therefore counteract the pressure in the control chamber 106. This provides a bias pressure representative of the torque capacity of the on-coming friction device which permits a more accurate control for the on-coming friction device C3.

The shift control chamber pressure will be increased by the controller 18 to overcome the bias pressure and the spring bias of spring 114 and to control the time that is required to fully engage the on-coming friction device C3. Once the shift interchange is completed, the passage P2 will be opened to the latch chamber 104, as described above, and the latch chamber 94 will be exhausted.

If, as shown in FIG. 2, the shift valve 16 is being controlled to the disengaged position, the pressure in control chamber 106 will be decreasing such that that pressure in friction device C3 will be exhausted at a controlled rate to control the off-coming time of the friction device C3. Thus, it should be clear that the shift valves 14 and 16 can control the timing of both the on-coming and off-going operation of their respective friction devices.

When the shift has been completed, and the shift valve 16 is positioned in the disengaged position shown in FIG. 3, the latch chamber 94 is pressurized from passage P2 through passages 98 and 96, while the chamber 104 is exhausted through passage 110.

It should be noted in FIG. 4 that the plug 102 is being forced upwardly by the pressure in the latch chamber 104. At this time, if desired, the pressure in the shift control chamber 106 can be discontinued thereby turning off the solenoid valves S2 and S3 saving on the electrical energy of the system. The latch valve 12, in its spring set position, will maintain the pressure in passage P2 thereby retaining the valves 14 and 16 in their selected conditions.

It should also be evident that if the electrical units should malfunction for some reason, for example, loss of electrical power, the transmission friction devices will be retained in the selected condition until the engine operation is discontinued and the pump 24 ceases to operate. Thus, the latching of each of the shift valves provides a control which permits continued operation in the event of electrical system discontinuance.

While the system described above shows two shift valves, namely 14 and 16, it will be apparent to those skilled in the art that any number of shift valves can be accommodated by this system and, in fact, multiple shift valves can be upshifted and downshifted by utilizing this system since the latching pressure is distributed as required to latch any and all of the shift valves in the selected operating conditions.

I claim:

1. A transmission shift control comprising:

a pair of shift valves;

each shift valve including an engaged latching chamber, a disengaged latching chamber, a shift control chamber and a means for controlling a pressure in the shift control chamber to permit said shift valves to be selectively moved to an engaged condition and a disengaged condition; and latching valve means for selectively distributing a latch pressure to said shift valves to selectively pressurize said engaged latching chamber and said disengaged latching chambers depending on the engaged or disengaged condition of each shift valve and selectively preventing distribution of said latch pressure when said shift valves are moving between the engaged and disengaged positions in response to said pressure in shift control chamber.

2. A transmission shift control comprising:

a shift valve including an engaged latching chamber, a disengaged latching chamber, a shift control chamber and a means for controlling a pressure in the shift control chamber to permit said shift valve to be selectively moved to an engaged condition and a disengaged condition; and latching valve means for selectively distributing a latch pressure to said shift valve to selectively pressurize said engaged latching chamber and said disengaged latching chamber depending on the engaged or disengaged condition of said shift valve and selectively preventing distribution of said latch pressure when said shift valve is moving between the engaged and disengaged positions in response to said pressure in shift control chamber.

* * * * *